Sept. 27, 1949.    F. URBACH    2,482,815
INFRARED PHOTOGRAPHY
Filed March 26, 1946    2 Sheets-Sheet 1
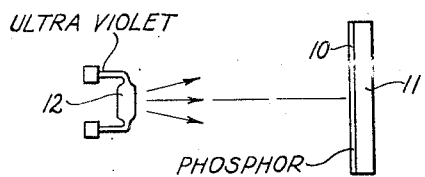
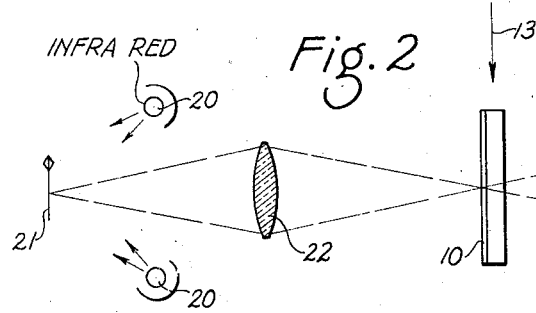
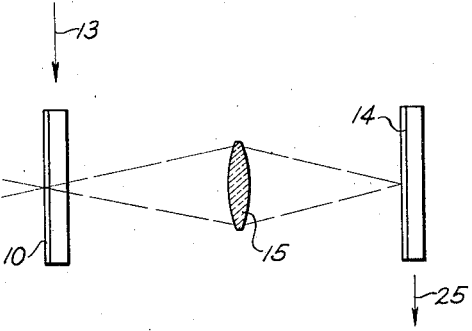
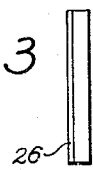
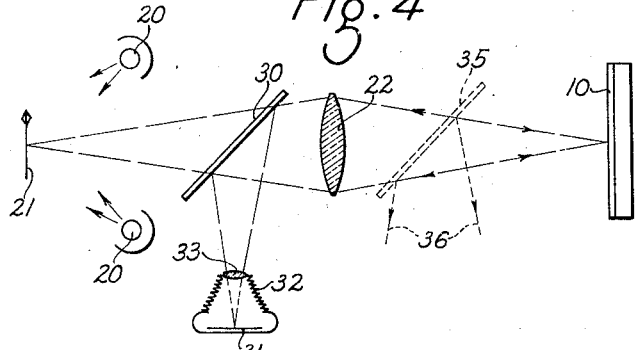
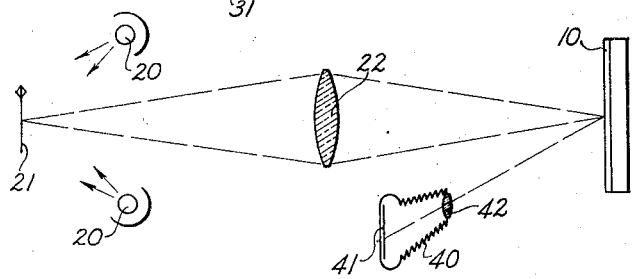
Franz Urbach
INVENTOR
BY
ATT'Y. & AG'T.

Sept. 27, 1949.  F. URBACH  2,482,815
INFRARED PHOTOGRAPHY
Filed March 26, 1946  2 Sheets-Sheet 2
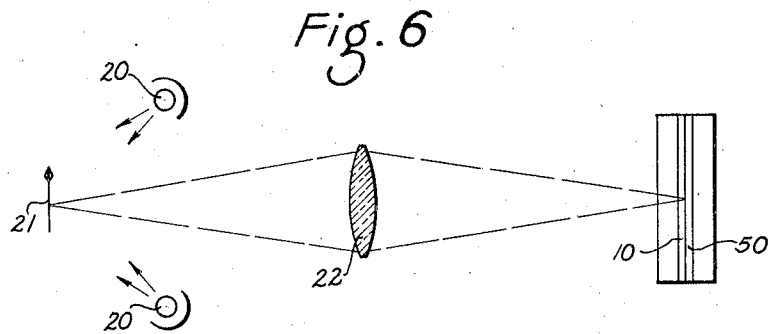
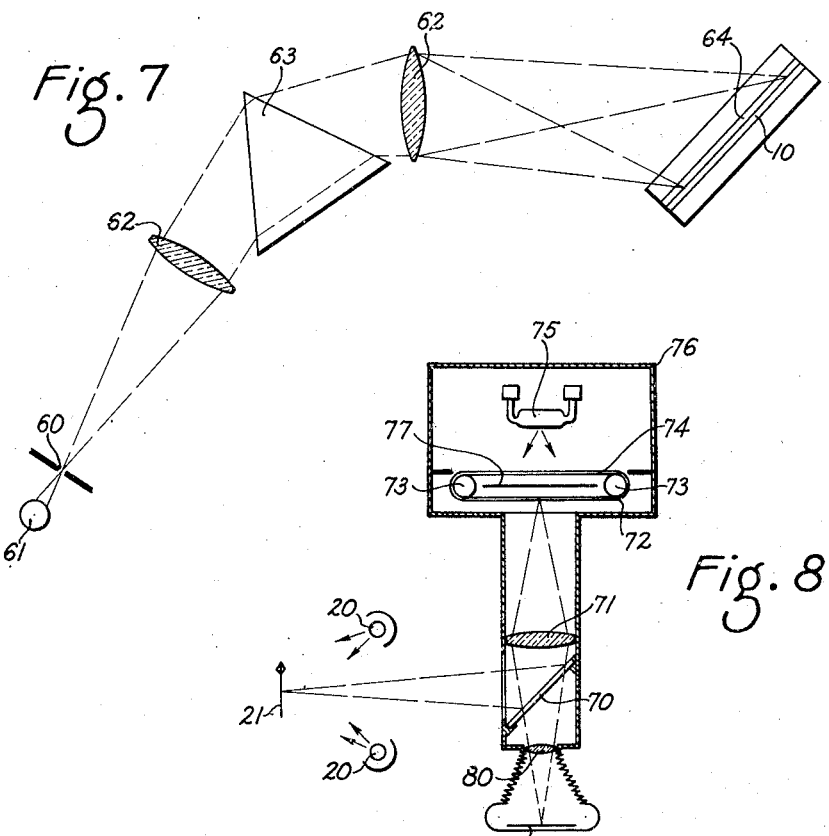
Franz Urbach
INVENTOR Patented Sept. 27, 1949

2,482,815

UNITED STATES PATENT OFFICE 2,482,815

INFRARED PHOTOGRAPHY

Franz Urbach, Rochester, N. Y., assignor to University of Rochester, Rochester, N. Y., a corporation of New York Application March 26, 1946, Serial No. 657,137

1 Claim. (Cl. 250—65)

This invention relates to infrared photography.

It is the object of the invention to provide a method of photography which permits the taking of photographs much further out in the infrared than has been hitherto possible, at least in any practical way.

It is also an object of the invention to provide a method of taking photographs at wavelengths beyond one micron with exposures on the same order as, or even much less than, those required with photographic emulsions sensitized by long chain cyanine dyes in spectral regions between .8 and 1.0 mu, which emulsions are the most sensitive infrared materials previously available. None of the infrared sensitive emulsions previously available had much sensitivity beyond 1.1 mu, whereas photography by the present method has its peak sensitivity at about 1.1 and in some cases 1.3 mu with useful sensitivity extending as far as 1.7 and even out to 2.0 mu. I have even produced useful sensitivity out to 2.3 mu.

Since photographic emulsions cannot be made sensitive to such long wavelengths, the problem which is solved by the present invention appears at first sight to involve something contrary to nature in that a photograph must be made on photosensitive material using infrared light of wavelength which is longer and hence of lower quantum energy than that required to expose the material. The present invention uses phosphors, but this feature alone does not eliminate the fundamental problem since it is known that a phosphor cannot give out a higher energy quantum than that which it receives. Therefore, an infrared quantum could not of itself cause the emission of a shorter wavelength quantum, such as a green one. The quantum laws of nature are satisfied, however, in the present invention by first exciting the phosphor with a short wavelength high quantum energy radiation and then by using the infrared radiation merely in trigger fashion to release the energy, specifically as light of wavelength intermediate between the short wavelength used for exciting the phosphor and the infrared light used for stimulating it to occasion the energy release. It should be noted that this stimulation is effectively opposite to the quenching of phosphorescence by infrared light.

According to the invention, therefore, a layer of phosphor of the type which stores excitation energy to release it later under the action of infrared light, specifically between 0.8 mu and 2.0 mu wavelength is excited uniformly with short wavelength radiation, such as violet or ultraviolet light or even by X-rays or the radiation from radioactive material. This excited phosphor layer, after the first momentary and spontaneous phosphorescence has died away, which may require a few seconds or a few minutes, is placed in printing relation, meaning either contact or projection printing, to a layer of photosensitive material, sensitive to the intermediate wavelength which will be emitted by the phosphor when stimulated by infrared light. The spontaneous phosphorescence must be allowed to die away to the point where it is insufficient to expose the photographic layer at least during the time that it is to be in contact therewith. The time allowed to permit the spontaneous afterglow to die down is referred to as the relaxation time. While the phosphor layer is held in printing relation to the photosensitive layer, an image in the infrared light is focused on the phosphor layer which thus is stimulated and releases wavelength of intermediate radiation which in turn exposes the photosensitive layer. The photosensitive layer is then processed to a photographic record in the usual way.

The exciting radiation is preferably violet or ultraviolet light, the stimulating radiation is predominantly between .8 mu and 2.0 mu since with shorter wavelengths, ordinary photographic methods with specially sensitized emulsions can be used. The exposing light released by the phosphor is usually in some visible region of the spectrum, but may be outside of the visible in the ultraviolet, for example. In the case where the phosphor is placed in contact with the photosensitive layer, it is sometimes preferable to focus the image through the photosensitive layer onto the phosphor layer since normally it is easy to make or select a photosensitive layer thin and sufficiently transparent to infrared light so as not to destroy the infrared image, whereas the most efficient phosphor layers are relatively more diffusing, reflecting and absorbing.

Cross reference is made to my two copending applications relating to delayed action photorecording Serial Nos. 657,135 and 657,136 filed concurrently herewith and also to my applications Serial Nos. 667,012 jointly with Pearlman and 667,013 both filed May 3, 1946, relative to phosphors particularly useful in the present invention. It should be pointed out that these inventions, while obviously interrelated, are quite independent of one another and were made at different times during the past several years as different necessities arose. Various factors, all due to war conditions, have caused the patent applications on these different inventions to be filed at about the same time.

The following examples are given of the composition of infrared sensitive phosphors which are particularly useful in the present invention. There are others which will work, but perhaps not as well as those here listed. As pointed out in my copending applications relative to the preparation and composition of phosphors themselves, each phosphor usually includes a base, a so called flux and at least one activator. The flux is used as with ordinary phosphors in about 1% to 10% or more. The concentrations of the activators appear in parts per million by weight relative to the whole phosphor before firing. The exact value depends on the specific details of the preparation and the quantities may be varied from those given without materially affecting their use for the present invention. The preparation of these phosphors follows the conventional methods used in preparing ordinary phosphors, it being noted that the sensitivity depends on the degree of oxidation of the sulfides and selenides. The present invention works best with the most sensitive phosphors, of course.

Certain of these phosphors have more than one spectral peak in their sensitivity to stimulation. In the present invention, the longest wavelength peak is the one of greatest interest and, therefore, attention will be confined to it. The point on the long wavelength end of the spectral response at which the sensitivity has fallen to 10% of this peak value is also of interest in connection with determining how far out in the spectrum the phosphor is useful. It can be used beyond this point with longer exposures, but for the sake of something definite the 10% value is selected.

visible light, for instance, filtered light from an incandescent lamp. During excitation of the phosphors, all stimulating or exhausting light must be eliminated. The afterglow which may last a few seconds (or even an hour in the case of phosphor #2 listed above) is allowed to die away and then the material may be stored for a period of time until needed. For example, in some cases the sensitivity of the layer to stimulating light falls only to a minor extent even after a week's storage at room temperature. Other phosphors, such as #6 and #10 listed above, must be kept cold from the time they are excited until they are used.

In any case, after the relaxation time and before the material has become insensitive, it is moved as indicated by arrow 13 into printing relation with a photosensitive material 14. In Fig. 2, the printing relation is established by a lens 15 which projects an image of the phosphorescent layer 10 on the photosensitive layer 14. Stimulating light, in this case infrared light of wavelength between .8 mu and 2.0 mu, from lamps 20 illuminate an object 21 which is to be photographed by infrared light. An infrared image of the object 21 is focused by a lens 22 on the phosphor 10 as indicated by broken lines. This infrared image stimulates the phosphor 10 causing it to emit visible light, such as green in the case of certain of the phosphors, which visible light is picked up by the lens 15 and focused onto the photosensitive layer 14 which must be sensitive to green light or whatever intermediate wavelength is released. As indicated by the arrow 25, the photosensitive layer 14 is processed to a photographic record 26 as shown in Fig. 3.

The exposure times required using ortho-

| | Base | Flux | Activators | Temperature of Use | Longer Wavelength Sensitivity Peak | 10% Sensitivity |
|---|---|---|---|---|---|---|
| | | | | | Microns | Microns |
| 1 | SrS | CaF₂ | Eu 100 Sm 100 | Room | 1.0 | 1.3 |
| 2 | do | LiF | Ce 100 Sm 40 | do | 1.0 | 1.3 |
| 3 | do | do | Cu 100 Sm 20 | do | 1.0 | 1.3 |
| 4 | do | do | Ce 100 Sn 10,000 | do | .63 | .85 |
| 5 | do | do | Cu 100 Bi 100 | do | .88 | .96 |
| 6 | CaS | Na₃BO₄, Na₂S₂O₇, CaF₂ | Pb 100 | Dry Ice | 1.0 | |
| 7 | ZnS | NaCl | Mn 200 Cu 1 | Room | 1.3 | 1.5 |
| 8 | do | do | Pb 40,000 Cu 1 | do | 1.3 | 1.5 |
| 9 | do | do | Pb 40,000 Cu 20 | do | 1.3 | 1.5 |
| 10 | SrSe-SrSO₃ | CaF₂ | Cu 50 | Liquid Nitrogen | 1.4 | 1.9 |
| 11 | do | do | Eu 100 Sm 100 | Room | .9 | 1.2 |
| 12 | do | do | Eu 100 Bi 100 | do | .9 | 1.0 |
| 13 | SrS | do | Cu 50 | Liquid Nitrogen | 1.8 | 2.5 |

The extreme limits of sensitivity of these materials is not yet known, but the last one appears to have fair sensitivity as far out as measurements have so far been made.

Some of these particular phosphors were developed by me as is indicated by my copending applications referred to above.

The manner in which the present invention may be performed will be fully understood from the following description when read in connection with the accompanying drawings in which:

Figs. 1, 2 and 3 constitute a flow chart of one embodiment of the invention.

Figs. 4 to 7, inclusive, illustrate alternative embodiments of the photographic step shown in Fig. 2.

Fig. 8 shows a more elaborate embodiment of the invention particularly useful for continuous recording, such as cinematography, and particularly useful with cold phosphors.

In Fig. 1 a phosphor 10 carried on a suitable transparent base 11 is excited by ultraviolet light from a lamp 12. Phosphors #1, 11 and 12, for example, in the above list may be excited by chromatic film for the photosensitive layer 14 are of the same order as those required with kryptocyanine sensitized photographic emulsions exposed in the nearer infrared, i. e. to wavelengths less than 1 micron. In fact, it appears that using optimum sensitivity with some of the above phosphors, it is possible to get useful exposures in considerably less time than the direct photographic methods at the shorter wavelength infrared region.

In Fig. 4 the light from the object 21 passes through a semi-transparent mirror 30 before being brought to focus on the phosphor 10. The lens 22 serves two purposes in this case. It first focuses the infrared light from the object 21 on the phosphor 10 and then focuses the green or other visible light coming from the phosphor so that after it is reflected from the mirror 30 it comes to focus on a film 31 in a camera 32 having a lens 33. The semi-transparent mirror 30 is preferably dichroic transmitting the infrared freely and reflecting the green highly.

The lens 33 could be omitted if the film 31 were placed at the plane conjugate to the phosphor 10 for the lens 22 with respect to green light. This may or may not be optically at the same distance from the lens 22 as is the object 21 because of the possible difference in focus for infrared and green light. Alternatively, a semi-transparent mirror 35 could be placed optically after the lens 22 as indicated by broken lines. A camera lens would then be necessary to focus the reflected rays 36.

Another possibility is shown in Fig. 5 where a camera 40 photographs the stimulated image on the phosphor 10 directly. This is possible because the phosphorescent light is emitted generally in all directions. The perspective is corrected by proper positioning of the film 41 relative to the lens 42 of the camera, which means that the lens 42 is not covering the full field of which it is capable, but otherwise this arrangement is quite satisfactory.

In Fig. 6, a photosensitive film 50 is placed in contact with the excited phosphor 10 and printed therefrom.

One particularly useful application of infrared photography is in spectrographic analysis in which the object being photographed is a narrow slit 60 as shown in Fig. 7, transmitting the light from a source 61 which is to be analyzed. This light is focused by two lenses 62 and is spread into a spectrum by a suitable prism system 63. The spectrum is distributed along the phosphor 10 in contact with which there is placed a photosensitive layer 64 sensitive to the light emitted by the phosphor. The phosphor may be confined to the infrared parts of the spectrum since it does not assist in any way, for example, in the photographing of the green region.

Fig. 7 differs from Fig. 6 by having the photosensitive layer 64 optically in front of the phosphor 10. This arrangement is always preferable even in direct photography (as illustrated in Fig. 6). This is because the most sensitive phosphors are relatively diffusing compared to thin photographic emulsions, especially with respect to infrared light. Thus, the arrangement in Fig. 7 gives better resolution and better utilization of the phosphor, the photosensitive layer 64 being sufficiently transparent to infrared light so as not to destroy the infrared image entirely. I find that most photographic films and plates are satisfactory as far as their transmission of infrared light is concerned.

In Fig. 8, the infrared light from the object 21 is reflected by a semi-transparent mirror 70 and is brought to focus by a lens 71 on a moving band of phosphor 72. The band passes around two rollers 73. That part 74 of the band which is facing away from the lens 71 is excited by light from an ultraviolet lamp 75. The particular phosphor used in this case is one having a short relaxation time. This arrangement is particularly useful with phosphors which require cooling to Dry Ice temperature or liquid air temperature since the whole chamber 76 containing the lamp and the moving phosphor or part of this chamber may be brought to the low temperature required.

A baffle 77 is included to prevent ultraviolet light reaching the part of the phosphor band which is toward the lens 71. The band 72 is usually moved intermittently exposing successive frames but may be moved continuously such as when recording a spot of light or when the relaxation time after stimulation is particularly short. The visible or other intermediate wavelength light emitted by the phosphor 72 passes through the lens 71 and the semi-transparent mirror 70 to be brought to focus by a lens 80 on a film 81 in a camera which may be a motion picture camera for making time studies and the like. As before, the semi-transparent mirror 70 is preferably dichroic, in this case reflecting infrared highly and transmitting green highly.

Having thus described the preferred embodiments of my invention, I wish to point out that it is not limited to these structures but is of the scope of the appended claim:

I claim:

The method of photography with photosentitive material and using light of wavelength longer and hence of lower quantum energy than that required to expose the material, which comprises, (a) exciting uniformly with short wavelength radiation a layer of a phosphor of the type which stores the excitation energy and releases it, in trigger fashion, when stimulated by longer wavelength radiation, the released energy being light of wavelength intermediate between the exciting and stimulating radiation wavelengths, (b) placing the excited phosphor layer in contact with a layer of photosensitive material sensitive to the intermediate wavelength light and sufficiently transparent to said longer wavelength not to destroy the longer wavelength image, (c) focusing an image in said longer wavelength light through the sensitive layer onto the phosphor layer to expose the photosensitive layer by the light released and (d) processing the photosensitive layer to a photographing record.

FRANZ URBACH.

REFERENCES CITED

The following references are of record in the file of this patent:

UNITED STATES PATENTS

| Number | Name | Date |
| --- | --- | --- |
| 1,565,256 | Christensen | Dec. 15, 1925 |
| 1,648,058 | Parker | Nov. 8, 1927 |
| 1,724,572 | Geisen | Aug. 13, 1929 |
| 2,074,226 | Kunz et al. | Mar. 16, 1937 |
| 2,203,352 | Goldmark | June 4, 1940 |
| 2,225,044 | George | Dec. 17, 1940 |

FOREIGN PATENTS

| Number | Country | Date |
| --- | --- | --- |
| 509,308 | Great Britain | July 11, 1939 |

OTHER REFERENCES

"Solid fluorescent materials," R. P. Johnson, American Journal of Physics, vol. 8, No. 3, pp. 143–153, June, 1940.